May 7, 1963 R. BERNSTEIN ETAL 3,088,774
BOTTOM DUMP TRAILER CONSTRUCTION
Filed March 18, 1959 3 Sheets-Sheet 3
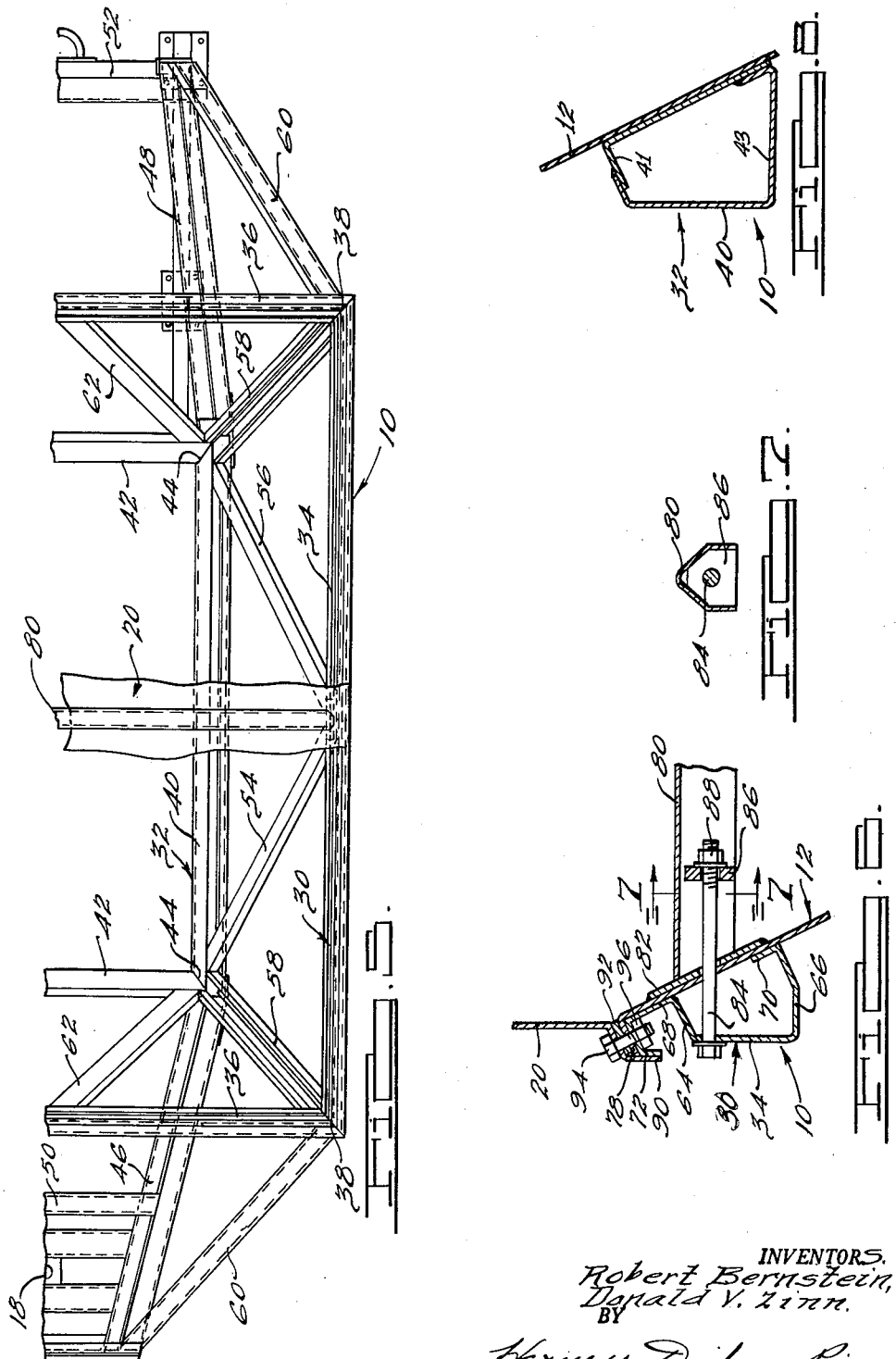
INVENTORS.
Robert Bernstein,
Donald V. Zinn.
BY
Harness, Dickey & Pierce
ATTORNEYS.

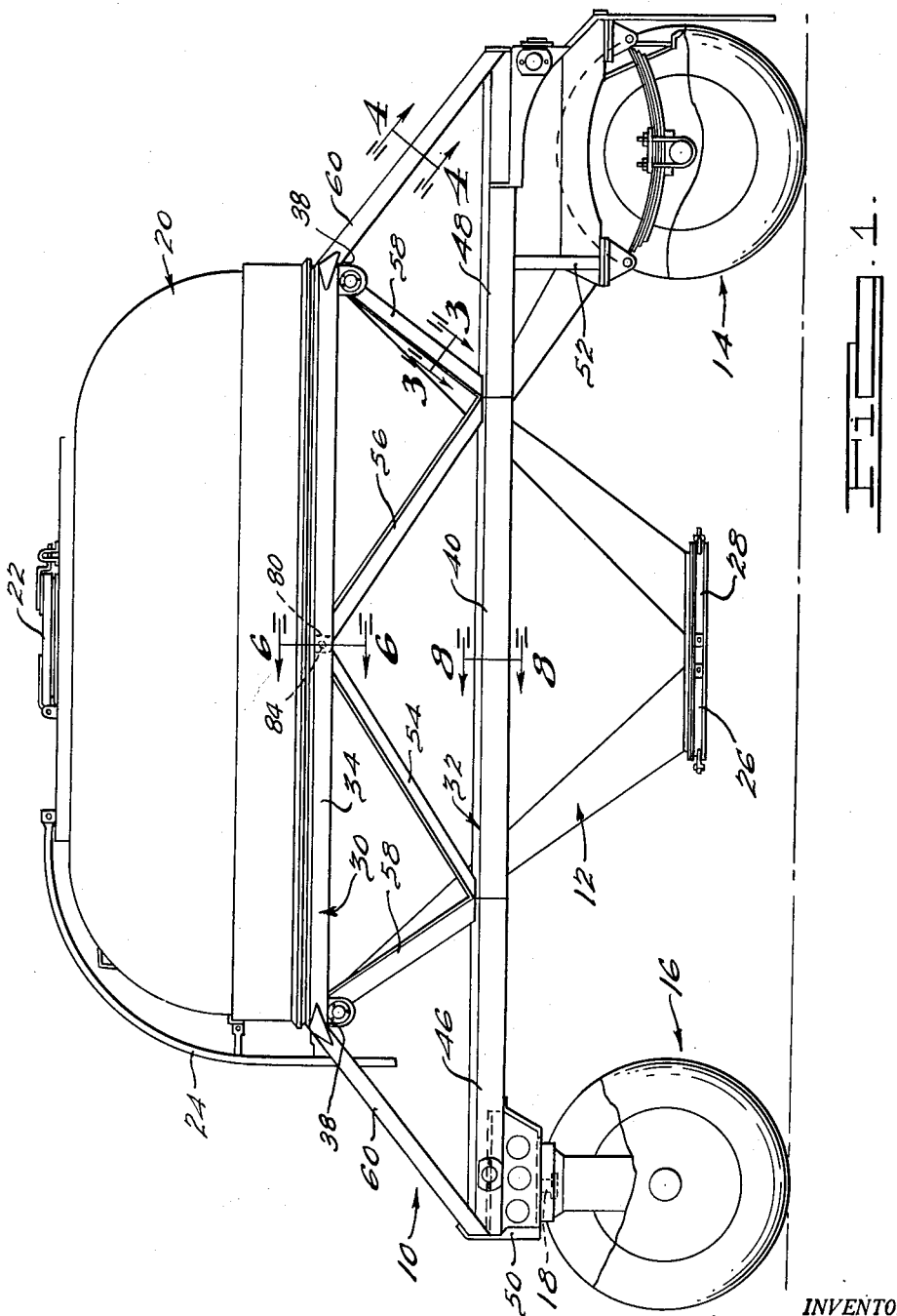

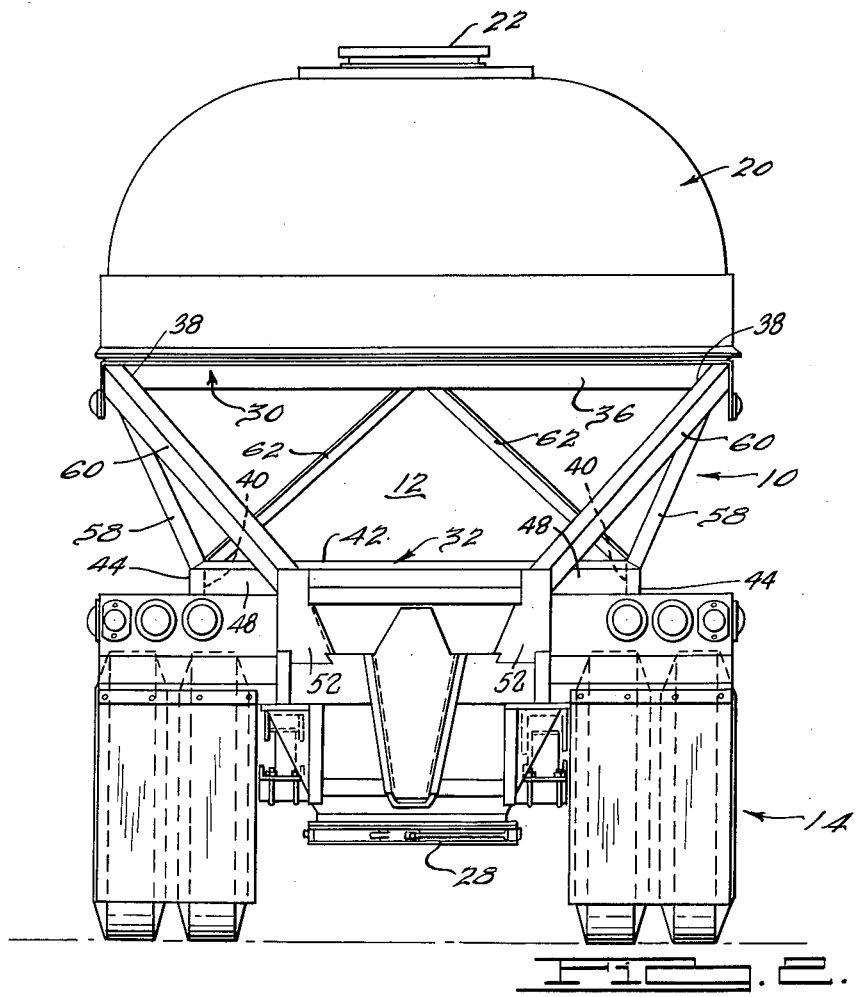
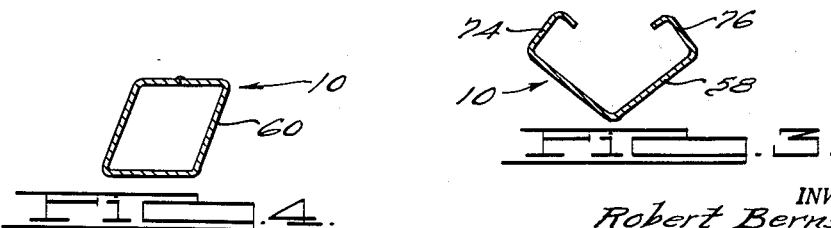

3,088,774
BOTTOM DUMP TRAILER CONSTRUCTION
Robert Bernstein, Omaha, Nebr., and Donald V. Zinn, Fresno, Calif., assignors to Fruehauf Trailer Company
Filed Mar. 18, 1959, Ser. No. 800,152
5 Claims. (Cl. 298—27)

This invention relates to new and useful improvements in dump trailers and particularly in bottom-dump hopper trailers of the type conventionally used to haul bulk material such as cement, sand, grain, dirt, and the like.

An important object of the present invention is to provide a novel supporting structure for the trailer hopper that is self-contained and essentially light in weight, and that is capable of carrying the entire load of the hopper and its contents as well as pulling stresses from the tractor to which the trailer is adapted to be hitched.

Another object of the invention is to provide a supporting structure that is uniquely connected to and correlated with the hopper so as to provide adequate support for the latter and at the same time will flex or yield under applied loads to distribute the load over the entire structure and prevent destructive concentration of stresses in the structure.

Still another object of the invention is to provide a bottom dump trailer of the above-mentioned character that is simpler and less expensive to manufacture than conventional trailers of this type.

Other objects and advantages of the invention will be apparent during the course of the following description.

In the drawings forming a part of this specification and wherein like numerals are employed to designate like parts throughout the same, FIGURE 1 is a side elevational view of a bottom dump hopper trailer embodying the invention;

FIG. 2 is a rear elevational view thereof;

FIG. 3 is an enlarged, transverse sectional view taken on the line 3—3 of FIG. 1;

FIG. 4 is an enlarged, transverse sectional view taken on the line 4—4 of FIG. 1;

FIG. 5 is a fragmentary, top plan view of the trailer supporting structure which carries the hopper;

FIG. 6 is an enlarged, fragmentary, vertical sectional view taken on the line 6—6 of FIG. 1;

FIG. 7 is a vertical sectional view taken on the line 7—7 of FIG. 6; and

FIG. 8 is an enlarged, fragmentary, vertical sectional view taken on the line 8—8 of FIG. 1.

Basically, the trailer of this invention comprises a main supporting frame 10 in the form of a box-sectional truss which surrounds and supports a centrally disposed hopper 12, adapted to carry a bulk load, such as cement, sand, grain, dirt or the like. The rearward end of the trailer is supported on a rear wheel suspension 14, and the forward end thereof is mounted on a front wheel suspension 16. The front suspension 16 preferably is pivotally attached to the structure 10 by a kingpin 18 according to conventional practice and it is adapted for attachment to a towing vehicle such as a truck-tractor or the like by a conventional drawbar (not shown). The hopper 12 can be open-topped if desired or it can be equipped with a cover 20, as shown in the drawing. In the latter event the cover is equipped with a top opening through which the load is introduced into the hopper 12 and the opening is closed by a conventional manhole collar and cover assembly 22. Access is had to the assembly 22 by a ladder 24 on the cover 20. The load is discharged from the hopper 12 through bottom openings which normally are closed by drop gates 26 and 28 of known design and construction.

The hopper 12 here shown is a four-sided, open-topped container. The side walls of the hopper 12 are downwardly tapered as best shown in FIGS. 1 and 2 and they terminate at their lower ends in the drop gate assembly 26, 28.

The main frame or chassis 10 has upper and lower perimetrical frames 30 and 32 which conform to and relatively snugly fit the hopper 12. Because of the downwardly tapered form of the hopper 12, the upper perimetrical frame 30 is larger than the lower frame 32, as shown in FIGS. 2 and 5. In the particular form of the invention here shown, the upper perimetrical frame 30 is generally rectangular in form having spaced parallel longitudinal elements or chassis members 34 and transverse elements 36 interconnected by mitered joints 38 at the corners of the frame. The lower perimetrical frame 32 similarly is generally rectangular in shape and is formed with longitudinal elements or chassis members 40 and transverse elements or chassis members 42 interconnected by mitered joints 44 at the corners of the frame. As seen in FIG. 8 of the drawings, the lower chassis members 40 may be made up of inner and outer portions 41 and 43 that are welded together. The inner portion 41 of the chassis member 40 preferably slopes angularly downwardly so as to be shiftably engageable with the downwardly convergent side walls of the hopper 12.

Forward and rearward extensions 46 and 48 are provided on the longitudinal structural elements 40 of the lower perimetrical frame 32. These extensions 46 and 48 extend in the same horizontal plane as the longitudinal structural members 40, but they preferably are inclined inwardly, as shown in FIG. 5. At the forward ends of the extensions 46 is a suitable framework 50 which carries the kingpin 18. Similarly, at the rearward ends of the extensions 48 is a suitable supporting framework 52 which carries the rear wheel suspension 14.

Diagonal truss elements interconnect the upper and lower perimetrical frames 30 and 32. In the particular truss construction here shown, truss members 54 and 56 extend in downwardly diverging relation from the middle of the longitudinal upper frame elements 34. These truss members engage and are connected to the lower perimetrical frame 32 substantially at the corners thereof. Other truss elements 58 extend angularly between the corners of the upper and lower perimetrical frames 30 and 32. Truss elements 60 extend from the corners of the other upper perimetrical frame 30 forwardly and downwardly to the distal ends of the forward and rearward extensions 46 and 48. Still other truss elements 62 extend downward in angularly divergent relation from substantially the middle of the upper transverse perimetrical frame elements 36 to the corners of the lower perimetrical frame 32.

In connection with the foregoing, it will be readily appreciated that the hopper 12 may vary somewhat in size and shape and the main truss framework accordingly may also vary somewhat in size and shape in accordance with the hopper. The various components or elements of the truss framework 10 are interconnected in any suitable manner as by riveting or welding to provide an essentially strong supporting structure. It, of course, is necessary in every instance that the framework 10 be strong enough to support the weight of the hopper 12 and its load, that it be able to withstand pulling stresses in use, and that it stand up adequately under normal handling and abuse to which it is subjected during operation of the trailer.

In the particular frame 10 here shown, the longitudinal and transverse structural elements 34 and 36 of the upper perimetrical frame 30 have the special cross-sectional shape shown in FIG. 6. Specifically, these elements are generally channel shaped in cross section with the flanges 64 and 66 thereof extending in the direction of the hopper 12. Both flanges 64 and 66 are formed with upwardly extending lip portions 68 and 70 which flatly engage and support the side walls of the hopper 12 as shown in FIG. 6. At the upper edge of the lip portion 68 is an outwardly rolled rim 72 which supports the cover 20, as also shown in FIG. 6. The longitudinal and transverse structural elements of the lower perimetrical frame 32 also have a special generally box-shape in transverse section, as shown in FIG. 8. The outer corner truss elements 60 also are box shaped but of a specifically different form, as shown in FIG. 4. Intermediate truss elements 54, 56, 58 and 62 preferably are generally V-shaped with inturned flange portions 74 and 76, as shown in FIG. 3. Manifestly, the particular structural forms here shown are given by way of example only, and it will be understood that different conventional or special structural forms can be used in the fabrication of the truss frame 10.

From the foregoing, it will be apparent that the hopper 12 is supported at the top thereof by the lip portions 68 and 70 of the upper perimetrical frame elements 34 and 36 and is supported by the inner sides of the lower perimetrical frame elements 40 and 42. The hopper 12 also may be, but is not necessarily supported by the various diagonal truss members 54, 56, 58 and 62; however these members preferably engage and support the flat sloping walls of the hopper. At its upper edge the hopper 12 is formed with an outturned flange 78 which overlays the rim 72 of the upper perimetrical frame 30.

It may be necessary or desirable to provide one or more braces or spreaders at the top of the hopper 12. The particular trailer here shown has a single spreader 80 extending transversely of the hopper at substantially the middle of the upper longitudinal perimetrical frame elements 34. The particular spreader 80 here shown is generally of inverted U-shape, as illustrated in FIG. 7, and it has downwardly tapered ends which bear on and flatly engage wear plates 82 welded on the hopper at the inner sides thereof (FIG. 6). Bolts 84 extend inwardly through the longitudinal frame elements 34, hopper 12, wear plates 82, and transverse retainers 86 disposed within and welded to the spreader 80. Nuts 88 on the bolts 84 hold the parts securely assembled.

The cover 20 has an outwardly offset lip 90 at the lower edge thereof which seats on and surrounds the rim 72 of the upper perimetrical frame 30 (FIG. 6), and the joint between the cover and the frame is closed by a sealing strip 92. Screws 94 provided at spaced intervals around the periphery of the cover 20 interconnect the latter to the hopper 12 and frame 10, as shown in FIG. 6, and nuts 96 on the screws hold the latter securely in place. Thus, screws 94 fasten the cover 20 to the frame 10 and hopper 12 and they also fasten the hopper 12 to the frame 10. In connection with the foregoing it is significant that the screws 94 constitute the sole connection between the hopper 12 and the frame 10. The lower perimetrical frame 32 and the diagonal truss elements 54, 56, 58 and 62 are not connected directly to the hopper 12 and accordingly, the lower portion of the truss framework 10 can flex or yield or in other words is shiftable relative to the hopper 12 when the hopper is filled. As a result, the load is distributed substantially uniformly over the various parts of the frame 10, stress transmission between the lower portions of the frame 10 and the hopper 12 being minimized, and destructive stress concentration in isolated elements of the frame is prevented. In effect, the truss frame 10 is shiftable about the hopper 12 so that the various components of the supporting framework properly adjust to the hopper 12 as the latter is filled.

A particular advantage of the instant construction is that the main truss framework 10 and the hopper 12 can be manufactured separately. The framework 10 can be fabricated in one jig or fixture and the hopper 12 in another jig or fixture. The hoppers 12 can be designed to a size and shape best suited for the particular load it is intended to carry, and within limits, all of the hoppers can be made to fit a standard framework 10. Thus, frameworks 10 mounted on front and rear wheel suspensions 14 and 16 can be mass produced, and various sizes and shapes of hoppers adapted for different types of loads can be separately mass produced. In any particular instance the hopper best adapted for the purpose at hand can be selected and placed in a standard chassis at final assembly. This greatly simplifies manufacturing procedures and reduces manufacturing costs. Also, the design permits the trailer to be made with or without a cover 20, in accordance with the nature of the load to be carried thereby and the requirements of the purchaser.

The manner in which the hopper 12 is removably associated with the supporting framework 10 and the fact that it normally is detachably connected to the framework substantially enhances the adaptability and versatility of the trailer in use. For example, a single chassis can be equipped with different hoppers adapted to carry different bulk materials; and, by reason of the fact that the hoppers are interchangeable in the chassis, the user in any particular situation can select the hopper best suited for the job at hand. It is not necessary for the user to have as many different complete trailers as there are materials to haul. By the same token, it is not necessary for him to attempt to haul a bulk load in a hopper that is not designed or particularly suited to that particular type of load. This represents a substantial saving.

The hoppers of course are much smaller than the complete trailer and when empty they can be readily handled and easily stored. Furthermore, by reason of their shape, the hoppers can be readily stacked for storage purposes when the covers are removed. In this connection it will be observed also that the cover can be readily adapted for use on different types of hoppers. All of the various types of hoppers can be used either with or without covers and when not in use the covers can be separately stacked for storage purposes.

What is claimed is:
1. A hopper device having a trussed chassis comprising
   (a) a pair of elongated laterally spaced lower chassis members,
   (b) a plurality of transverse chassis members connecting said lower members,
   (c) a pair of spaced upper chassis members vertically spaced above said lower members,
   (d) a plurality of members forming a truss between said upper and lower members, and
   (e) a hopper seated along and secured only to said upper chassis members extending downwardly between said upper and lower chassis members, the lower portion of said hopper being shiftable relative to said lower chassis members to minimize deleterious stress transmittal therebetween upon loading of said hopper.
2. A hopper device having a trussed chassis in accordance with claim 1 wherein said hopper is shiftably engageable with said lower chassis members.
3. A hopper device having a trussed chassis in accordance with claim 1 wherein said lower chassis members have laterally spaced pairs of road contacting wheels at opposite ends thereof.
4. A hopper device having a trussed chassis in accordance with claim 1 wherein said hopper is removably seated on said upper chassis members.
5. A hopper device having a trussed chassis in accordance with claim 1 wherein said hopper has downwardly convergent side walls shiftably seated on complementary downwardly convergent portion on said lower chassis members.

(References on following page)

References Cited in the file of this patent

UNITED STATES PATENTS

| | | |
|---|---|---|
| 337,828 | Gathright | Mar. 16, 1886 |
| 347,553 | Batchelor | Aug. 17, 1886 |
| 468,588 | Westover | Feb. 9, 1892 |
| 661,029 | Bower | Nov. 6, 1900 |
| 718,742 | Umholtz | Jan. 20, 1903 |
| 783,939 | Ernsberger | Feb. 28, 1905 |
| 973,210 | Rakowsky | Oct. 18, 1910 |
| 1,038,491 | Hazen | Sept. 10, 1912 |
| 1,196,391 | Parker et al. | Aug. 29, 1916 |
| 1,659,109 | Lawrence | Feb. 14, 1928 |
| 2,056,179 | Fitch | Oct. 6, 1936 |
| 2,060,130 | Scott | Nov. 10, 1936 |
| 2,144,042 | Armington | Jan. 17, 1939 |
| 2,299,702 | Mosel | Oct. 20, 1942 |
| 2,339,098 | Nagin | Jan. 11, 1944 |
| 2,760,815 | La Brode | Aug. 28, 1956 |